UNITED STATES PATENT OFFICE.

ALBERT DECATUR BARR, OF BATESVILLE, ARKANSAS.

MEDICAMENT AND PROCESS OF MAKING THE SAME.

966,643. Specification of Letters Patent. Patented Aug. 9, 1910.

No Drawing. Application filed July 22, 1909. Serial No. 508,882.

*To all whom it may concern:*

Be it known that I, ALBERT DECATUR BARR, a citizen of the United States, residing at Batesville, county of Independence, and State of Arkansas, have invented new and useful Medicaments and Processes of Making the Same, of which the following is a specification.

This invention relates to medicaments and processes of making the same; and it comprises a new and useful compound of medical value comprising a saline derivative of phenacetin chemically united with an alkaloid, this alkaloid being preferably one of the cinchona group such as quinin; and it also comprises a process of making such a compound wherein phenacetin is combined with an acid and the composition thus produced is united with an alkaloid; all as more fully hereinafter set forth and as claimed.

Phenacetin, like many of the other modern antipyretics, exercises a depressing effect on the heart action and its use is thereby limited to some extent, it not being safe or desirable to administer as large a dose in many instances as would otherwise be desirable.

I have discovered that by making a chemical combination between phenacetin and certain alkaloids having a tonic or stimulating action on the heart I can produce new bodies which possess all the antipyretic value of such phenacetin without this depressing action upon the heart and which have a number of other advantages, among which may be mentioned an increase of power to ease pain and produce sleep, and a decrease in the objectionable after-effects ordinarily resulting from the use of phenacetin. Being chemical combinations the ratio between the phenacetin and the other bodies combined therewith is invariable which causes a great advantage in the dosage of these new bodies. Furthermore, the new bodies being chemical combinations act rather differently in administration for medicinal purposes, and are better assimilated than would be a mechanical mixture. As the alkaloidal component of the new compound I prefer quinin or other cinchona alkaloid. In producing these new bodies I preferably first combine the phenacetin with the equivalent amount of an acid, such as hydrochloric acid. Phenacetin containing an amin group, it is able to combine with the stronger acids to form bodies of a saline nature. Upon treatment with hydrochloric acid, for instance, it forms a hydrochlorid. It is better to use acid in the equivalent amount since an excess of acid tends to decompose the phenacetin with the formation of other bodies. Upon now treating this phenacetin combination with an alkaloid, such as quinin, a new combination takes place with evolution of heat. The nature of the reaction thus taking place is uncertain and I content myself with noting the fact without attempting an explanation. Other alkaloids having a tonic effect upon the heart may be used in lieu of quinin but I prefer quinin.

Taking hydrochloric acid as a typical acid for the present purposes the phenacetin may first be treated with aqueous HCl, the acid being used, preferably, in such proportion as to give one part of HCl to 4.94 parts of phenacetin, this being the theoretical amount required for combination with such phenacetin. Heat is generated by the action of the acid upon the phenacetin. Upon now treating the product with a molecular proportion of quinin, heat is evolved and the mass becomes liquid. Upon termination of the reaction the new substance is obtained as a crystallized powder having a tint which is sometimes greenish but is reddish if the combination be completed and the material be pure. This new combination is crystalline and is slightly hygroscopic when exposed to the atmosphere at temperatures between 75° F. and 100° F. It melts between 219.2° F. and 220° F. (104° C. and 105° C.). It is soluble in about 52 parts of water, but is readily soluble in alcohol. In practically carrying out the stated reactions, 480 grains of phenacetin may be placed in a mortar and thoroughly triturated with aqueous hydrochloric acid. The amount of acid used for this amount of phenacetin should contain 97.14 grains of HCl. For instance, with a 31.9 per cent. hydrochloric acid, 304.51 grains of solution should be employed. Upon completion of the reaction, add 864 grains of anhydrous quinin. Where the crystallized quinin containing 3 molecules of water of crystallization is employed, the quantity added should be correspondingly increased. The mass becomes fluid, heat is developed and the mass finally crystallizes into a powder of a tint varying between greenish and reddish. This product after washing is ready for use. It may be administered in any of the ordinary vehicles. This body represents a chemical combination of the phenacetin, the acid and the quinin employed, and its proximate analysis is substantially as follows: Phenacetin, 33.30 per cent., hydrochloric acid, 6.78 per cent., and quinin, 59.93 per cent. This product is stable and combines the antipyretic value of the phenacetin with the stimulating action of the quinin. There is also some further modification of the action of both ingredients due to their combination. Morphin, cinchonin and other alkaloids may be used in lieu of quinin.

With the compound derived from quinin and phenacetin, the minimum dose for an adult to produce an antipyretic effect would be five grains and the maximum twenty-five grains. As a rule the dose should be about nine grains.

What I claim is:—

1. The process of producing a medicament which comprises adding an equivalent amount of an acid to phenacetin and treating the resultant compound with an alkaloid.

2. The process of producing a medicament which comprises adding an equivalent amount of an acid to phenacetin and treating the resultant compound with a cinchona alkaloid.

3. The process of producing a medicament which comprises adding an equivalent amount of an acid to phenacetin and treating the resultant compound with quinin.

4. As a new composition of matter, a chemical compound comprising united phenacetin, acid and alkaloid groups, said composition being crystalline, slightly hygroscopic, soluble in alcohol and slightly soluble in water.

5. As a new composition of matter, a chemical compound comprising united phenacetin, acid, and a cinchona alkaloid group, said composition being crystalline, slightly hygroscopic, soluble in alcohol and slightly soluble in water.

6. As a new composition of matter, a chemical compound comprising united phenacetin, acid and quinin groups, said composition being crystalline, slightly hygroscopic, soluble in alcohol and slightly soluble in water.

ALBERT DECATUR BARR.

Witnesses:
W. J. WARD,
T. ALBERT.